F. L. DYER.
ELECTRIC WELDING.
APPLICATION FILED DEC. 20, 1917.
1,296,780.
Patented Mar. 11, 1919.
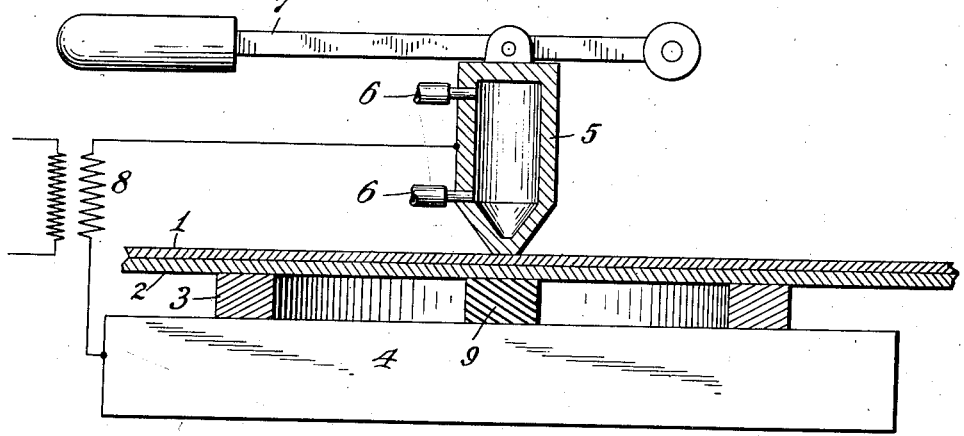
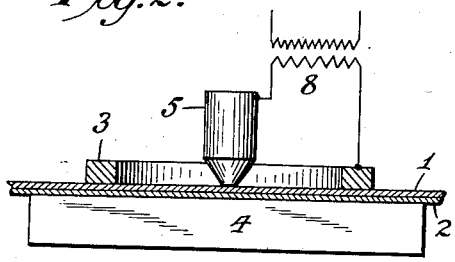
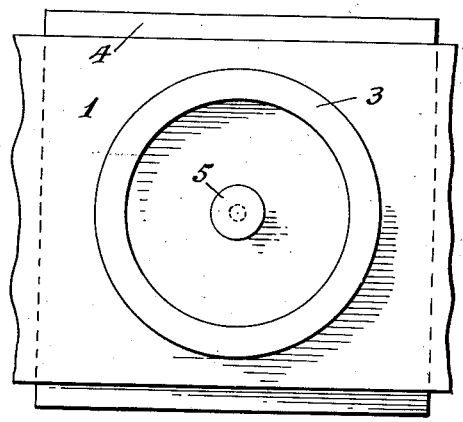
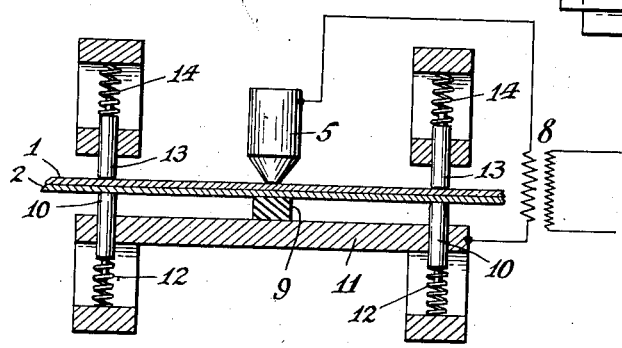
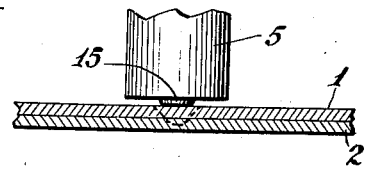
Inventor:
Frank L. Dyer

UNITED STATES PATENT OFFICE.

FRANK L. DYER, OF MONTCLAIR, NEW JERSEY.

ELECTRIC WELDING.

1,296,780.   Specification of Letters Patent.   Patented Mar. 11, 1919.

Application filed December 20, 1917. Serial No. 208,167.

*To all whom it may concern:*

Be it known that I, FRANK L. DYER, a citizen of the United States, residing in the town of Montclair, county of Essex, and State of New Jersey, have invented new and useful Improvements in Electric Welding, of which the following is a specification.

My invention relates to an improved process of electric welding in which the desired welding temperature is obtained by the resistance of the metal to a current of low voltage and high amperage. The process is particularly designed for the welding together of comparatively thin iron and steel sheets as, for instance, in the manufacture of kitchenware, steel furniture, cabinets, steel cars, etc. The process may, however, be utilized for the welding of other metals and for the welding of heavier forms than sheets such as light angles, channels and bars or for the welding of sheets to such forms, as may be practised in many industrial arts.

By my improved process the abutting metal surfaces will be intimately and rigidly connected by a series of isolated welds, each of comparatively limited area and placed as close together or as far apart as the requirements of each case may indicate. The improved process is one in which the welds are produced very quickly, the metal (if not too thick) being brought almost instantaneously to the welding temperature and pressure at the same time being imposed between the metal surfaces to be joined, whereby the temperature throughout the sheet, at the welding point, will be substantially uniform and hence the character of the metal will not be affected.

My improved process consists in utilizing a single electrode having the desired small area of contact which is brought with the required pressure upon the sheet, plate or other metal form to be welded to another sheet, plate or other metal form, and in utilizing therewith a second electrode making contact with one or both of the sheets, plates or other metal forms, said second electrode being either a ring which surrounds the first electrode or a series of contact devices connected to or making contact with one or both of the sheets, plates or other metal forms, or otherwise of large contact area, whereby the current in the neighborhood of the first electrode will be intensely localized so as to heat the sheet, plate or other metal form in the neighborhood of the first electrode to the desired welding temperature, while by the diffusion of the current to the second electrode there will be insufficient heating effect to secure a welding action, or to affect the structure of the sheet. The heat thus developed at the first electrode will almost instantaneously progress through the sheet, plate or other metal form into the surface of the abutting sheet, plate or other metal form, so as thereby to secure the desired plasticity of the metal to permit a weld to take place under the pressure imposed between the two metal surfaces. It will be understood that when the welding is to be performed between sheets of different thickness or between a sheet and a heavier metal form, the first electrode should be engaged with the thinner sheet or thinner object, so that the welding temperature will progress as rapidly as possible to the abutting surfaces which are to be joined, or in other words, the concentration of the current should be affected in connection with the metal sheet or form in which heat conduction will proceed most rapidly to the surface at which the weld is to be made.

In order that the invention may be better understood attention is directed to the accompanying drawing in which, Figure 1 is a sectional view illustrating a suitable apparatus for welding two thin metal sheets together and wherein the second electrode in the form of a ring is in contact with the bottom sheet, Fig. 2 a corresponding view showing a modification in which both electrodes are in contact with the top sheet, Fig. 3 a plan view of Fig. 2, illustrating how the current is localized at the first electrode and diffused at the second electrode, Fig. 4 a corresponding view illustrating the second electrode as a series of spring-pressed plungers making contact with the bottom sheet, the apparatus being particularly designed for welding together metal forms other than sheets with plane surfaces, and Fig. 5 an enlarged view of two sheets being welded together, showing roughly in dotted lines the section of the two sheets brought to welding temperature and illustrating a form of electrode which may be used to secure the maximum pressure effect.

In all of the above views corresponding parts are represented by the same reference numerals.

Referring first to Fig. 1, I show two plates, 1 and 2, made preferably of iron or steel, which it is desired to weld together by a series of small isolated welds. These sheets are placed one on the other and supported by a ring 3 constituting the second electrode resting on a metal base 4. The first electrode 5 has a working end brought down to the required small area as shown and is preferably hollow so that it may be water-cooled by circulating water in the pipes 6, 6. Pressure may be applied to the electrode 5 in any suitable way as by a lever 7. Current of low voltage and high amperage is supplied to the electrodes 3 and 5 in any suitable way, as by connecting them as shown to the secondary 8 of a suitable transformer. In operation it will be understood that when the electrode 5 is brought into contact with the upper plate 1 with the required pressure, the circuit will be closed between the electrodes and will be intensely localized immediately beneath the reduced end of the electrode 5 so as to heat the upper plate 1 to the welding temperature. This heating will extend through the plate 1 roughly as shown in dotted lines in Fig. 5 so as to bring the two abutting surfaces to the desired condition of plasticity and under the pressure a weld will be formed. When the weld is made the circuit is broken either by lifting off the electrode 5 from the plate 1 or by breaking the circuit of the secondary 8 in the usual way. The desired amount of current to be used, the pressure to be applied and the time required will in each case depend upon the thickness of the metals to be joined, as will be obvious to those skilled in the art. In order to support the plates 1 and 2 I preferably use a block 9 which may be made of some insulating material such as asbestos and which makes contact with said plate immediately in line with the electrode 5.

In Figs. 2 and 3 I illustrate the same apparatus except that in this case the second electrode 3 is held firmly in contact with the upper plate 1. Here there will be the same diffusion of the current at the electrode 3 and the same concentration of the current at the electrode 5 but the penetration of the temperature through the plate 1 will not be quite so effective as when the second electrode makes contact with the bottom plate 2 as shown in Fig. 1. The use of an annular electrode such as 3 is entirely satisfactory when flat plates are to be welded together in connection with which there will be a sufficiently good contact with an extended area of said ring but for irregular surfaces such as will be encountered in the manufacture of kitchen-ware, for instance, such an electrode will not be so efficient. Therefore, the arrangement generally illustrated in Fig. 4 may be employed. Here the second electrode comprises a series of plungers 10 which are slidably mounted in a plate 11 and are pressed in contact with the metal surface by springs 12 or in any suitable way. Each plunger will therefore be independent and will make contact with the plate or other metal surface, regardless of its shape or irregularities. Any number of these contact plungers may be used and if sufficiently large in area only one of them need be employed, it being only necessary that the area of the second electrode shall be sufficiently large to secure the desired diffusion of the current to prevent the welding of the metal in its neighborhood.

In Fig. 4 I illustrate a second set of plungers 13 with springs 14, which press the sheets firmly upon the plungers 10 to secure the desired electrical contact. These plungers 13 may, if desired, be electrically connected in the circuit so as to assist in the diffusion of the current at the second electrode, as I have explained.

Referring to Fig. 5, I illustrate roughly in dotted lines the general heating curve defining the welding temperature in the two abutting plates. The heat is somewhat greater at the upper part of the plate 1 than at its lower surface contiguous to the surface of the plate 2. When the sheets to be joined are thin the heating takes place so rapidly that an electrode of the general shape shown in Fig. 1 may be used to give the required pressure without producing more than a comparatively slight depression in the upper surface of the plate 1. When the plates are thicker, however, there might be danger of the electrode penetrating too deeply into the plate and therefore the construction shown in Fig. 1 may be employed in which the electrode 5 is shown as being provided with a boss 15 on its bottom surface which makes contact with the plate 1 and concentrates the current. When the welding temperature has been reached the pressure will force the boss 15 into the softened metal and thereupon the enlarged lower end of the electrode will engage the softened metal and effectively apply the necessary pressure thereto for the formation of the desired welds.

Having now described my invention, what I claim as new therein and desire to secure by Letters Patent is as follows:—

1. The process of electrically welding two thin plates or similar metal objects together, by a series of disconnected separate welds each of small area, which consist in pressing a single electrode of small contact area against one of the plates to thereby apply pressure between the plates in the locality of the desired weld, in passing an electric current between the electrode and plate to concentrate the current at and in the neighborhood of the contact whereby the welding heat thus produced will be conducted to the surfaces to be welded and a weld will be formed under the pressure so imposed, and in diffusing the current radially to a contact of large area located annularly with respect to the electrode and at a substantial distance therefrom, substantially as set forth.

2. The process of electrically welding two thin plates or similar objects together, by a series of disconnected separate welds each of small area, which consist in pressing a single electrode of small contact area against one of the plates to thereby apply pressure between the plates in the locality of the desired weld, in then passing an electric current between the electrode and plates so as to concentrate the current at the place of contact, whereby the welding heat thus produced will be conducted to the surfaces to be welded and a weld will be formed under the pressure so imposed and in diffusing the current radially to a contact of large area engaging the other plate and located a substantial distance from the electrode, substantially as set forth.

3. The process of electrically welding two thin plates or similar metal objects together by a series of disconnected separate welds each of small area, which consist in pressing a single electrode of small contact area against one of the plates to thereby apply pressure between the plates in the locality of the desired weld, in passing an electric current between the electrode and plates to thus concentrate the current at the place of contact, whereby the welding heat thus produced will be conducted to the surfaces to be welded and a weld will be formed under the pressure so imposed, applying to the other plate in line with electrode an insulating heat resisting block to receive the mechanical thrust and in diffusing the current radially to a contact of large area located a substantial distance from the electrode, substantially as set forth.

4. The process of electrically welding two thin plates or similar metal objects together, by a series of disconnected separate welds each of small area, which consist in pressing a single electrode of small contact area against one of the plates to thereby apply pressure between the plates in the locality of the desired weld, applying a series of spring pressed electrodes against one of the plates at a distance from the first electrode, said spring pressed electrodes constituting a contact area relatively large with respect to that of the single electrode, and in then passing an electric current between the electrodes so as to concentrate the current at the first electrode and diffusing the same radially to the distant spring pressed electrodes whereby the welding heat thus produced will be conducted to the surfaces to be welded and a weld will be formed under the pressure so imposed, substantially as set forth.

This specification signed and witnessed this 19th day of December, 1917.

FRANK L. DYER.

Witnesses:
A. E. RENTON,
J. M. MERRILL.